INVENTOR
ROWLAND E. BALL
BY John O. Evans, Jr.
ATTORNEY

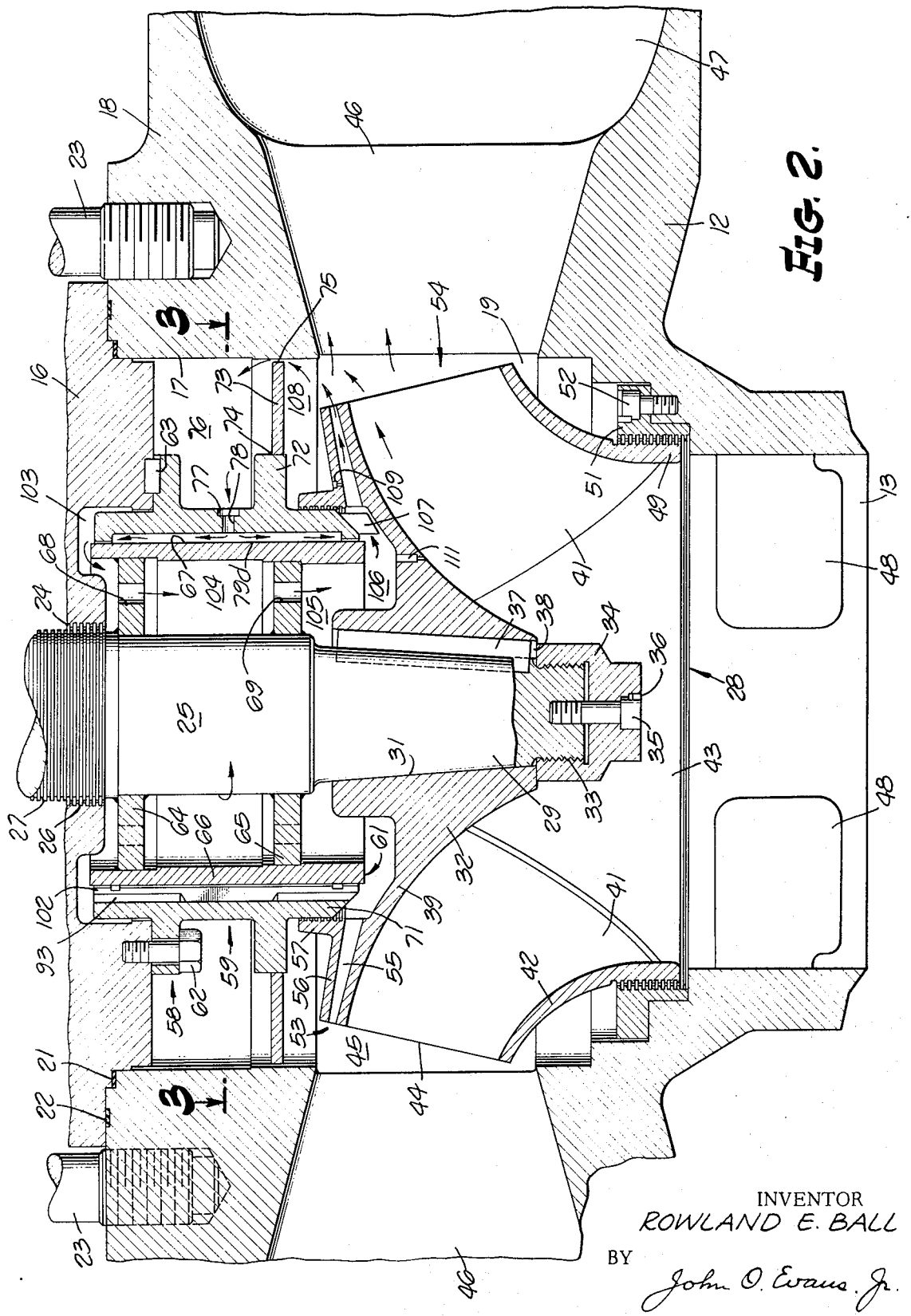

June 20, 1972   R. E. BALL   3,671,137
CENTRIFUGAL PUMP WITH HYDROSTATIC BEARING
Filed June 22, 1970   3 Sheets-Sheet 3

INVENTOR
ROWLAND E. BALL
BY
John O. Evans, Jr.
ATTORNEY

United States Patent Office 3,671,137
Patented June 20, 1972

3,671,137
CENTRIFUGAL PUMP WITH HYDROSTATIC BEARING
Rowland E. Ball, Long Beach, Calif., assignor to Borg-Warner Corporation, Chicago, Ill.
Filed June 22, 1970, Ser. No. 48,369
Int. Cl. F04d 29/66, 7/00; B61f 17/00
U.S. Cl. 415—104
7 Claims

ABSTRACT OF THE DISCLOSURE

A vertical shaft, centrifugal pump has a steady bearing in the form of a radial hydrostatic bearing that journals the shaft, the hydrostatic bearing being energized by liquid circulated to it from the discharge zone of the pump impeller, the circulation of the bearing-energizing liquid being accomplished by an auxiliary centrifugal impeller driven by the shaft, the auxiliary impeller preferably being mounted on the main pump impeller.

FIELD OF THE INVENTION

This invention relates to centrifugal pumps of the type having a radial hydrostatic bearing adjacent to the pump impeller for steadying the shaft. More particularly the invention relates to the energizing or pressurizing of the hydrostatic bearing by pumping a portion of the main stream of the liquid passing through the pump to the hydrostatic bearing.

SUMMARY OF THE INVENTION

An object of the invention is to provide a centrifugal pump having a steady bearing in the form of a hydrostatic bearing, the pump having simple and effective structure, including an auxiliary impeller driven by the shaft that drives the main impeller, by means of which the hydrostatic bearing is energized when the pump is operating.

Another object is to provide, in such a pump, an improved impeller having two impeller sections, one section for pumping the main body of fluid and the other section for pumping a part of the main body of fluid to the hydrostatic bearing.

These, and other aims, objects, and advantages of the invention, as may appear in this description or be inferred therefrom, are achieved in a centrifugal pump including a case having a chamber therein, the case having a suction port and a discharge port; a rotary impeller shaft extending into the chamber; a main centrifugal impeller in the chamber and mounted on the shaft for rotation therewith; the impeller being constructed and arranged to receive liquid from the suction port and, responsive to rotation, to pass the liquid through itself and discharge the liquid from the impeller at an increased energy level; liquid-flow passage means for receiving liquid discharged from the impeller and for conducting the liquid to the discharge port; a journal on the shaft; a hydrostatic bearing receiving the journal and hydrostatically supporting it when the bearing is energized; and means including an auxiliary centrifugal impeller driven by the shaft for circulating liquid from the liquid-flow passage means through the hydrostatic bearing to energize it.

BRIEF DESCRIPTION OF THE DRAWINGS

FIG. 2 is an enlarged, fragmentary, vertical sectional view taken through the axis of the impeller shaft of the pump shown in FIG. 1;

DESCRIPTION OF THE PREFERRED EMBODIMENT

Figure 1:
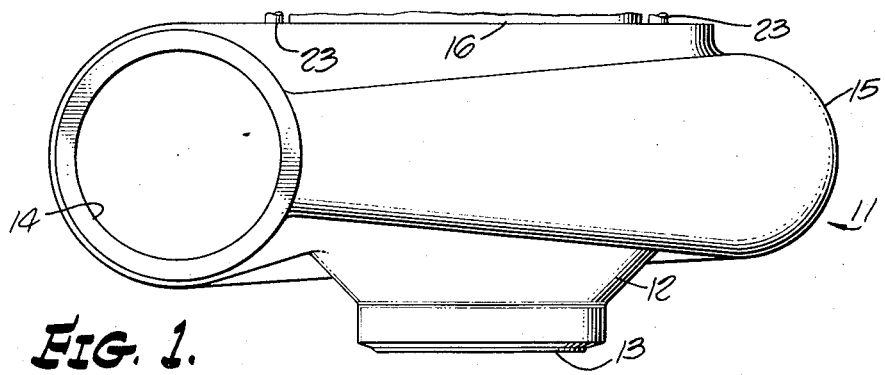
FIG. 1 is an elevational view of a vertical shaft centrifugal pump embodying the invention.

Referring to the drawings, particularly to FIG. 1, there is shown a vertical shaft, centrifugal pump, designated by the general reference numeral 11. The pump has a case 12, including a suction port 13 and a discharge port 14. As is usual in centrifugal pumps, the case has an integral volute or scroll 15 for conducting the liquid being pumped to the discharge port 14. A top cover plate 16, which is removably fastened to the top of the case 12, may be taken off to provide access to the interior of the case for repair or replacement of the pump parts.

Figure 3:
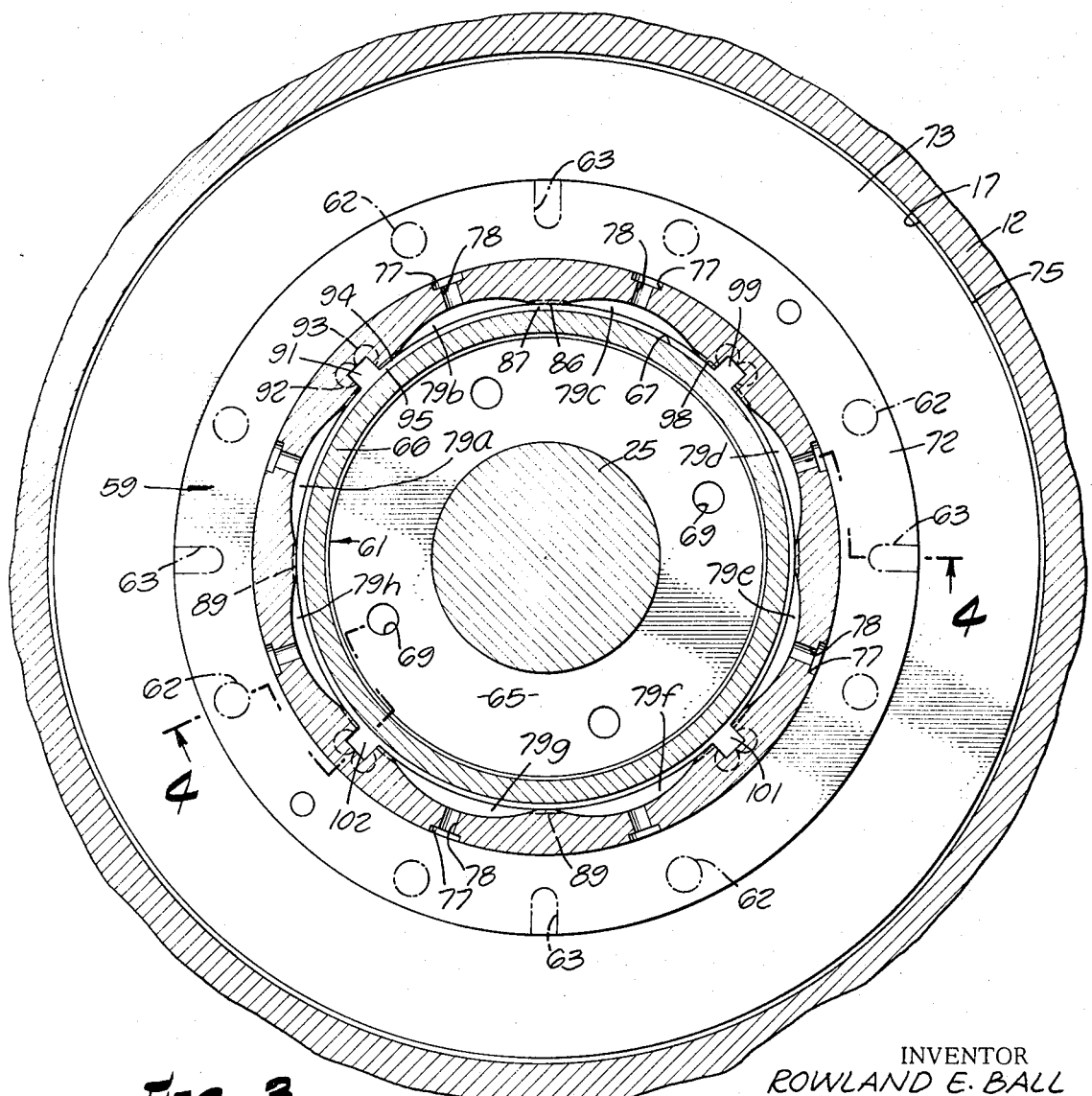
FIG. 3 is a transverse sectional view taken on the line 3—3 of FIG. 2 and looking in the direction of the arrows.

Referring to FIGS. 2 and 3, it is seen that the case has a cylindrical access opening 17 extending through the upper wall 18 of the case and opening into a central cylindrical chamber 19. The previously mentioned top cover plate 16 closes the access opening, the cover being sealed to the upper wall of the case by circular gaskets 21 and 22. The cover plate is removably secured to the upper wall 18 by a clamping-ring member (not shown) overlying the upper surface of the cover plate, the clamping-ring member being slidably received on the studs 23, 23 and being pressed down upon the plate 16 by nuts (not shown) threaded to the upper ends of the studs to thereby force the cover plate into sealing relation with the upper wall of the pump case.

The cover plate has a central shaft opening 24 through which a vertical shaft 25 extends from the exterior of the pump into the chamber 19. Axially spaced, circumferential grooves 26 are provided in the cover plate 16, these grooves facing the shaft opening 24 and being opposed by similar grooves 27 on the shaft 25. The grooved portion of the shaft is radially spaced from the grooved portion of the cover plate to provide a close clearance therebetween, the opposed groove portions of the shaft and cover plate cooperating to provide, in well known manner, a labyrinth seal between the shaft and the cover plate. Further sealing means (not shown), such as a mechanical seal, may be employed to seal the shaft 25 to the top of the cover plate 16.

The shaft 25 is supported for rotation in the direction of the arrow shown in FIG. 2 by means of a vertical thrust bearing (not shown) and is driven by an electric motor (not shown), both the thrust bearing and the motor being located above the pump.

An impeller, generally indicated at 28 is mounted on the lower end 29 of the shaft. For this purpose, the lower end of the shaft is tapered downwardly and receives the correspondingly tapered bore 31 in the hub 32 of the impeller. The end of the shaft is threaded at 33 to receive a nut 34 threaded thereon for retaining the impeller on the shaft. The retaining nut 34 is locked to the shaft by a lock screw 35, the screw being in turn locked to the retaining nut 34 by a locking pin 36. Rotation of the impeller upon the shaft is prevented by a key 37 longitudinally mounted on the shaft end 29 and projecting radially into a corresponding keyway 38 in the impeller hub 32.

Extending outwardly from the hub 32 of the impeller 28 is a generally disc-shaped web 39. Supported by this web is a plurality of impeller vanes 41 of the usual outwardly extending and backwardly curved configuration. At their edges opposite to the web 39, the vanes 41 support a shroud 42, the shroud being an upwardly flaring annular member open at the bottom 43 to the influx of liquid from the suction port 13. This lower portion formed by the bottom of the shroud is generally referred to as the eye of the impeller. The impeller has a peripheral discharge or liquid outlet 44. The radially outer zone 45 of the central cylindrical chamber in which the impeller 28 is disposed receives the liquid discharged from the impeller outlet 44 and hence may be termed the impeller discharge chamber 45. This section of the impeller is sometimes referred to herein as the main impeller.

Disposed radially outwardly from the impeller discharge chamber is a plurality of diffusion vanes 46. These vanes are integral with the pump case 12 and are evenly spaced circumferentially around the chamber 45. The vanes curve outwardly and forwardly in the direction of rotation of the impeller. The spaces between the diffusion vanes 46 provide liquid-flow passages communicating the impeller discharge chamber 45 with the interior 47 of the volute 15, which, in turn, forms a liquid-flow passage communicating with the pump discharge port 14 (FIG. 1).

Within the suction port 13 are mounted suction splitter vanes 48, 48 that function to minimize swirling of liquid in the suction port and tend to streamline the flow of liquid therethrough. These vanes may be welded to the walls of the suction port.

The bottom outer portion of the impeller shroud 42 is cylindrical and is grooved to provide a wear ring or clearance ring 49. An opposed, fixed, grooved wear ring 51 is mounted on the case 12 and is secured thereto by one or more screw fasteners 52 locked by a locking pin 53. The wear rings 49 and 51 are arranged with a close clearance therebetween to provide a labyrinth seal that minimizes leakage of liquid from the discharge side of the impeller back to its suction side when the pump is in operation.

Formed integrally with the main impeller is an auxiliary impeller, designated by the general reference numeral 53. The web 39 is common to the main impeller, generally designated 54, and the auxiliary impeller 53, the two impellers forming the entire impeller component 28.

The auxiliary impeller 53 has a plurality of radially extending vanes 55 that are integral with the web 39. These vanes curve outwardly and rearwardly with respect to the direction of rotation of the impeller. Formed integrally with the vanes 55 is an auxiliary impeller shroud 56. This shroud is an annular, discoidal member that has, at its radially inner edge, an upstanding, cylindrical, grooved clearance ring 57.

Immediately above the impeller 28 is a steady bearing and journal assembly, designated by the general reference numeral 58, which, in operation, maintains the common axis of the shaft 25 and the impeller 28 substantially coincident with the axis of the bearing. The steady bearing and journal assembly has a radial hydrostatic bearing 59 which is stationarily mounted in the case 12. The shaft 25 has a journal 61 affixed to it, the journal being disposed within the bearing 59 and adapted to be hydrostatically supported and centered by the bearing when it is supplied with energizing liquid.

The bearing 59 is fastened to the top cover plate 16 by a plurality of cap screws 62, only one of which is shown in FIG. 2. Keys 63, only one of which is seen in FIG. 2, engage in corresponding slots in the cover plate 16 and in the bearing 59 to anchor the bearing against rotation relative to the cover plate.

The journal 61 has a pair of vertically spaced flanges 64 and 65 welded to the shaft 25. A cylindrical journal sleeve 66 is welded to the outer rims of the flanges 64 and 65, the outer cylindrical surface 67 of the journal sleeve being disposed so as to be hydrostatically centered in relation to the bearing 59 when the pump is running. The upper journal flange 64 has a number of circularly spaced holes 68 therethrough, and a like number of holes 69 are provided in the lower journal flange 65 for a purpose to be explained hereinafter.

The lower portion of the hydrostatic bearing 59 is cylindrical and provides a smooth clearance ring portion 71 that coacts with the clearance ring 57 of the previously mentioned auxiliary impeller 53 to minimize leakage through the space between these clearance rings.

The flange 72 on the bearing 59 has an annular radial plate 73 welded to it at 74. The rim of the radial plate 73 is spaced inwardly from the cylindrical access opening 17 of the upper wall of the case to form an annular liquid conduit 75 between the rim of the plate and the wall of the access opening.

An annular chamber 76, above the plate 73, receives liquid flowing through the annular liquid conduit 75 and supplies this liquid to the hydrostatic bearing 59 to energize it. This annular chamber 76 is defined between the annular radial plate 73, a portion of the outer periphery of the bearing 59, a portion of the underside of the cover plate 16 and a portion of the side wall of the access opening 17. A number of holes 77 spaced about the circumference of the bearing 59 communicate the annular chamber 76 with the interior of the bearing. These holes have restricted inner portions 78.

Figure 4:
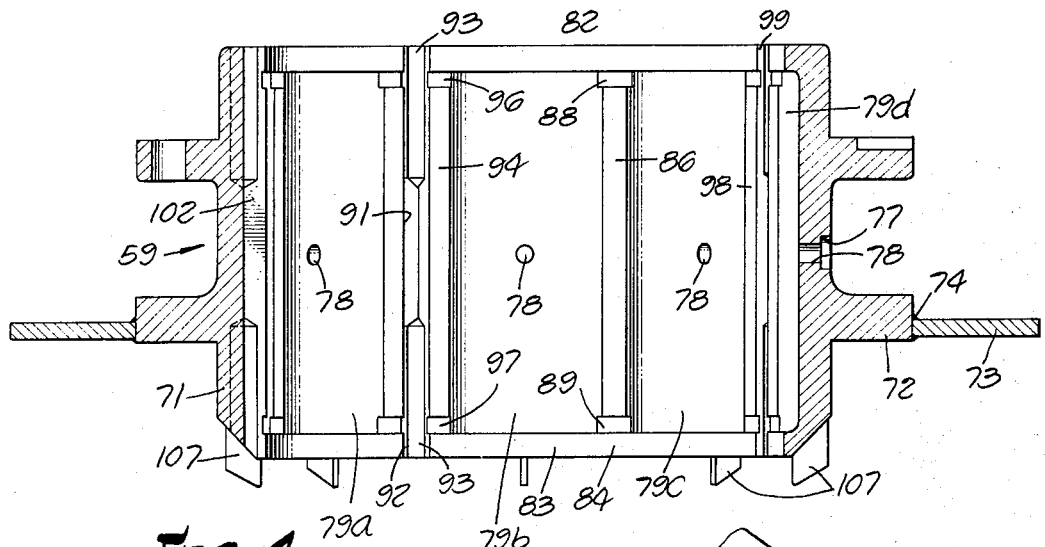
FIG. 4 is a sectional view taken on the line 4—4 of FIG. 3 and looking in the direction of the arrows.
Figure 6:
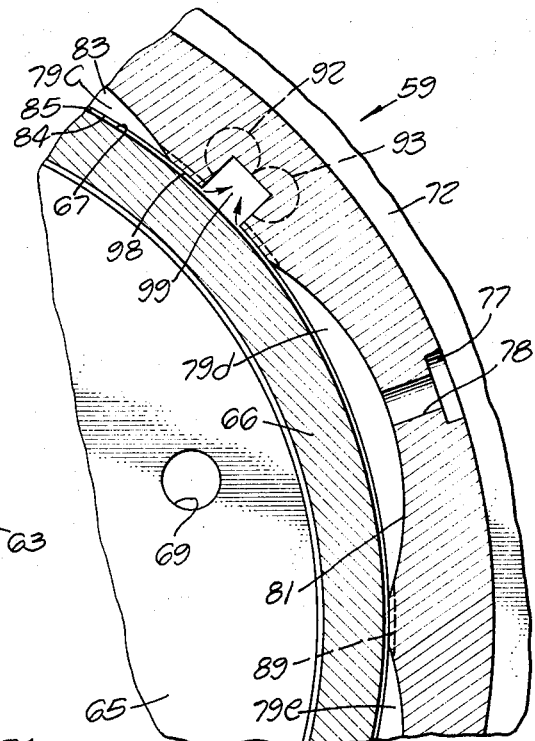
FIG. 6 is an enlarged fragment of the hydrostatic bearing shaft journal arrangement as shown in FIG. 3.

As best seen in FIGS. 3 and 4, the bearing 59 has a plurality, specifically 8, of pockets 79a, 79b, 79c, 79d, 79e, 79f, 79g, and 79h spaced circumferentially around its inner bore and opening inwardly of the bearing. As seen in FIG. 6, these pockets are concave, the wall 81 of each pocket providing an inwardly facing cylindrical surface. It will be seen that each pocket 79a through 79b has one of the holes 77, 78 located centrally thereof. The upper and lower ends of adjacent pairs of pockets, such as the pair 79b and 79c, are closed by end walls 82 and 83, respectively. As best seen in FIG. 6, these end walls, as exemplified by the end wall 83, have cylindrical inner surfaces, such as the surface 84, that are coaxial with the journal sleeve 66 and spaced from its outer surface 67 to provide gaps, such as the gap 85, that communicate the interior of the pockets with the exterior of the bearing 59 at its upper and lower ends.

A transverse rib 86 separates the pocket 79b from the pocket 79c. This rib (see FIG. 3) is spaced from the outer surface 67 of the journal sleeve by the same distance as the end walls 82 and 83 to provide another gap 87 that inter-communicates the pockets 79b, 79c in the circumferental direction.

Referring to FIG. 4, the ends of the transverse rib 86 are relieved to provide slots 88 and 89 that enlarge the gap between the pockets 79b and 79c.

Between the pockets 79a and 79b there is provided a transverse trough 91 extending from one end to the other end of the bearing 59. This trough is enlarged at its extremities by counter bores 92 and 93. A lip 94 (see FIGS. 3 and 4) extends transversely of the bearing between the pocket 79b and the trough 91. This lip is spaced outwardly from the outer surface 67 of the journal the same distance as the end walls 82 and 83, and provides with the surface 67 of the journal yet another gap 95 (see FIG. 3) that communicates the pocket 79b with the trough 91. The lip 94 is relieved at its ends to form slots 96 and 97 that enlarge the gap 95.

Another lip 98, similar to the lip 94 (see FIGS. 4 and 6) is interposed between the pocket 79c and another trough 99 that is similar to the trough 91 and that separates the pockets 79c and 79d.

It will be seen from FIG. 3 that the pockets 79b and 79c form a pair that is located between the pair of troughs 91 and 99. A similar pair of pockets 79d and 79e is positioned between the troughs 99 and 101. In the same way, a similar pair of pockets 79f and 79g is associated with the troughs 101 and 102. In like manner, the similar pair of pockets 79h and 79a are related to the trough 102 and 91.

Figure 5:
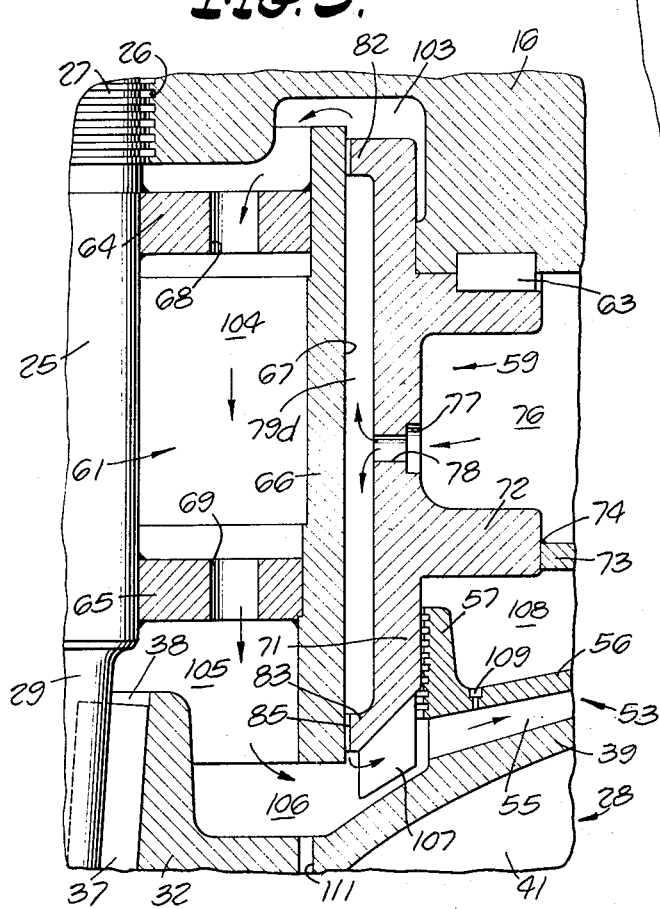
FIG. 5 is an enlarged fragmentary view of a portion of the hydrostatic bearing and shaft journal arrangement as shown in FIG. 2.

Between the upper ends of the bearing 59 and the journal 61, on the one hand, and the top cover plate 16, on the other hand, a generally annular upper liquid-receiving chamber 103 is provided (see FIGS. 2 and 5).

An intermediate chamber 104 is provided in the journal 61 between the upper and lower flanges 64 and 65. A lower annular chamber 105 is provided by the lower portion of the journal 61 between the lower flange 65 and the bottom of the journal. This lower annular chamber provides a suction chamber for the auxiliary impeller 53. The auxiliary impeller has an annular eye 106 that communicates with the suction chamber 105 and delivers liquid to the auxiliary impeller 53. Suction splitting vanes 107 (see FIGS. 2 and 4) depend from the bottom of the hydrostatic bearing 59 into the eye 106 of the auxiliary impeller and serve to reduce swirling of liquid in the eye and to effect efficient delivery of the liquid to the auxiliary impeller.

Referring to FIG. 2, it is seen that an annular auxiliary impeller discharge chamber 108 is located immediately above the main impeller discharge chamber 45 and is in direct communication with the latter chamber. The zone of demarcation between these discharge chambers is, of course, indistinct, as indicated by the flow-arrows in FIG. 2. There is, inevitably, some intermixing of liquid between the discharge chambers.

With further reference to FIG. 2, the auxiliary impeller shroud 56 has a single small drain hole 109 therethrough for draining liquid from the upper surface of the shroud when the pump is shut down. Another small drain hole 111 is bored through the web 39 of the impeller to drain the annular eye 106 of the auxiliary impeller.

In operation, the pump having been primed, the shaft 25 is set in motion in the direction of the shaft-arrow shown in FIG. 2. Liquid, for example water, is drawn from the suction port 13 into the eye 43 of the main impeller and moved, owing to the rotation of the impeller, outwardly through the channels between the impeller vanes 41 to the peripheral main impeller discharge 44. The liquid is discharged from the impeller and received in the discharge chamber 45, from whence it flows outwardly between the diffusion vanes 46 into the interior 47 of the volute 15. The liquid then flows through the volute to the pump case discharge port 14.

As indicated by the flow-arrows in FIG. 2, some of the liquid discharged from the impeller flows from the impeller discharge chamber 45 into the superjacent, auxiliary impeller discharge chamber 108. Thence, the liquid flows through the annular liquid conduit 75 and into the annular chamber 76. From the chamber 76, the liquid flows into the hydrostatic bearing pockets 79a–79h through the holes 77, 78, to energize the bearing.

Liquid escapes from the bearing pockets through the spaces 85 at the ends of the pockets (see FIGS. 2 and 5). Liquid can flow between adjacent pockets of a pair of pockets, such as 79b and 79c, through the gap 87 (see FIG. 3). Liquid may escape from the pockets circumferentially into troughs, such as the trough 91 through the gaps 95. The liquid that flows out of the pockets over the end walls, and that flows over the transverse ribs into the transverse troughs, is conducted to the auxiliary impeller for essential recirculation, as shown by the flow-arrows in FIGS. 2, 5 and 6.

Liquid from the chamber 103 at the top of the bearing assembly returns to the auxiliary impeller 53 through the holes 68 and 69 in the flanges of the journal 61, into the auxiliary impeller suction chamber 105, and thence into the eye 106 of the auxiliary impeller. Liquid that escapes from the bottom of the steady bearing and journal assembly 58 flows directly into the eye 106 of the auxiliary impeller 53, and is thence pumped by the auxiliary impeller.

As seen in FIG. 2, the liquid discharged from the auxiliary impeller is recycled in large part to the hydrostatic bearing, as indicated by the flow-arrows.

The way in which the energized hydrostatic bearing 59 serves to maintain the journal 61 centered is well understood by persons skilled in the art, as hydrostatic bearings, per se, are known in the art. In brief, however, should the journal and shaft become radially displaced toward one side of the bearing, the liquid pressure increases in the pocket or pockets at the one side, because the gaps between the bearing and the journal are decreased to thus throttle the outflow of liquid from these pockets and increase the back pressure. At the same time, the pressure of the liquid decreases in the diametrically opposite pocket or pockets, because of the increase in fluid flow through the widened gap between these pockets and the journal. These changes in liquid pressure act in a direction to restore the shaft to its centered position. Every excursion of the shaft and journal from centered position is automatically counteracted to restore the shaft and journal to their normal centered positions.

From the foregoing description it will be seen that the present invention provides a centrifugal pump assembly that achieves the objects of the invention. Moreover, it will be understood that the preferred embodiment shown and described herein is merely exemplary of the invention, and that various changes may be made therein by persons merely skilled in the art without departing from the invention as defined in the claims.

I claim:
1. A centrifugal pump comprising:
 (a) a case having a chamber therein, said case having a suction port and a discharge port;
 (b) a rotary impeller shaft extending into said chamber;
 (c) a main centrifugal impeller in said chamber and mounted on said shaft for rotation therewith;
 (d) said main centrifugal impeller being constructed and arranged to receive liquid from said suction port and, responsive to rotation, to pass the liquid through itself and discharge the liquid at an increased energy level;
 (e) liquid-flow passage means positioned about said main centrifugal impeller for receiving liquid discharged from said main centrifugal impeller and for conducting the liquid to said discharge port;
 (f) a journal on said shaft;
 (g) a hydrostatic bearing surrounding said journal and hydrostatically supporting it when said bearing is energized, said bearing having inlet means for the admission of energizing liquid and outlet means for the efflux of energizing liquid;
 (h) auxiliary centrifugal pumping means including suction means, an auxiliary centrifugal impeller driven by said shaft, and discharge means;
 (i) first liquid conduit means communicating said bearing inlet means solely with said liquid-flow passage means for supplying energizing liquid to said bearing only from said liquid-flow passage means;
 (j) second liquid conduit means communicating said bearing outlet means solely with said suction means of said auxiliary centrifugal pumping means for conducting all of the effluent energizing liquid from said bearing to said auxiliary centrifugal pumping means as its only liquid input, and
 (k) said discharge means of said auxiliary centrifugal pumping means being in fluid communication solely with said liquid flow passage means for discharging all of the liquid from said auxiliary centrifugal pumping means only into said liquid-flow passage means and in generally parallel, adjacent, and concurrent flow relationship to the liquid discharged from said main centrifugal impeller into said liquid-flow passage means.

2. A centrifugal pump comprising: a case having a chamber therein, said case having a suction port and a discharge port; a rotary impeller shaft extending into said chamber; a main centrifugal impeller in said chamber and mounted on said shaft for rotation therewith; said impeller being constructed and arranged to receive liquid from said suction port and, responsive to rotation, to pass the liquid through itself and discharge the liquid at an increased energy level; liquid-flow passage means for receiving liquid discharged from said impeller and for conducting the liquid to said discharge port; a journal on said shaft; a radial hydrostatic bearing receiving said journal and hydrostatically supporting it when said bearing is energized; and means in liquid flow communication with said liquid-flow passage means and including an auxiliary centrifugal impeller mounted on said main centrifugal impeller for circulating liquid from said liquid-flow passage means through said hydrostatic bearing to energize it; wherein said main impeller has a substantially liquid-impervious web extending outwardly from said shaft, and said auxiliary impeller is mounted on said web, and has an annular eye, a peripheral discharge means, and vanes providing passages connecting said eye and said discharge means, said main and auxiliary impellers discharging generally parallel and mutually adjacent liquid streams; and said hydrostatic bearing has a plurality of circulrly spaced pockets facing said journal and is spaced from said journal to permit liquid to flow from said pockets through the space between said bearing and said journal, first liquid conduit means for conducting the liquid that flows from said pockets through said space to the eye of said auxiliary impeller, and second liquid conduit means communicating said discharge means of said auxiliary impeller with said pockets.

3. A centrifugal pump as defined in claim 2 including flow-restricting orifice means in said second liquid conduit means.

4. A centrifugal pump as defined in claim 2 wherein said journal is spaced radially outwardly from said shaft, and said first liquid conduit means includes a liquid passageway extending through said journal in the direction of the axis of rotation of said shaft.

5. A centrifugal pump as defined in claim 2 including a shroud on said auxiliary impeller, a first clearance ring on said shroud, and a second clearance ring on said bearing opposite to and closely spaced from said first clearance ring and cooperating therewith to minimize leakage of liquid through the space between said rings.

6. A centrifugal pump as defined in claim 5 including a second shroud on said main impeller, opposed, spaced clearance rings on said second shroud and said suction port, respectively, that cooperate to minimize leakage of liquid through the space between said last mentioned clearance rings.

7. A centrifugal pump as defined in claim 2 wherein said shaft is vertical.

References Cited

UNITED STATES PATENTS

| 2,796,027 | 6/1957 | Brown | 415—112 |
| 2,811,109 | 10/1957 | Brill et al. | 415—112 |
| 3,220,350 | 11/1965 | White | 417—370 |
| 3,431,860 | 3/1969 | Atz | 415—112 |

FOREIGN PATENTS

| 205,313 | 1908 | Germany | 415—106 |
| 652,168 | 10/1937 | Germany | 415—109 |

HENRY F. RADUAZO, Primary Examiner

U.S. Cl. X.R.

308—9, 122; 415—111